United States Patent Office 3,492,154
Patented Jan. 27, 1970

3,492,154
PROCESS FOR PRODUCING MICROPOROUS
POLYMERIC MATERIALS
Robert V. Einstman, Wilmington, Del., assignor to E. I.
du Pont de Nemours and Company, Wilmington, Del.,
a corporation of Delaware
No Drawing. Continuation-in-part of application Ser. No.
510,661, Nov. 30, 1965. This application Sept. 30, 1966,
Ser. No. 583,447
Int. Cl. B44d 1/44
U.S. Cl. 117—119.4                                      8 Claims

ABSTRACT OF THE DISCLOSURE

An improved process for preparing a microporous sheet material in which a polymer solution is applied to a porous substrate wherein the polymer solution contains a polymeric component which will form a microporous structure, a solvent for the polymeric component and a critical amount of non-solvent for the polymeric component; the polymer solution is applied to the porous substrate and is then coagulated by reducing the temperature of the polymer solution, for example, by immersing the substrate in a cold water bath.

---

This application is a continuation-in-part of the copending patent application Serial No. 510,661, filed Nov. 30, 1965, now abandoned, which is a continuation-in-part of patent application Ser. No. 393,364, filed Aug. 31, 1964, now abandoned.

This invention pertains to a novel process for preparing microporous polymeric materials, and more particularly, to an improved process whereby the rate of production of such material is substantially increased.

Microporous polymeric sheet materials are currently being used as leather replacements in such items as shoes, boots, gloves, clothing, chair covers, and are also being used in such things as ink pads, paint rollers, battery separators, filter media, synthetic biological membranes and bearing materials.

One useful process for preparing microporous polymeric materials is taught in Holden U.S. Patent 3,100,721, which produces sheet materials of uniform microporosity, excellent tactile and tensile properties, and is applicable to a wide variety of substrates and thicknesses of products. However, this and related processes for producing microporous polymeric sheet materials have disadvantages for continuous production because of the relatively slow rate of coagulation of the polymeric component after a substrate has been treated therewith. When utilizing these processes in the continuous manufacturing of microporous polymeric sheet materials, the slow coagulation rate of the polymer component not only restricts the production rate but requires large tanks containing media to coagulate the polymeric component.

To provide a commercially practical process for producing microporous sheet material, it is extremely desirable to have a process which rapidly coagulates the polymeric component so that production rates can be economical and space requirements for equipment and processing can be significantly less than the prior art required. The process of this invention overcomes these difficulties of the prior art processes, and in particular, provides a process which rapidly coagulates the polymeric component to a microporous form in a minimum space using simple readily available equipment.

In the process of this invention, a porous substrate is treated with a polymeric composition in which the polymeric component has a secant tensile modulus at 5% elongation of above about 600 pounds per square inch under the subsequent conditions of washing and drying. Following application to the substrate, the polymeric component is coagulated and the treated substrate containing the coagulated polymeric component is washed and dried. It is an important feature of this process that the polymeric composition is a solution containing the polymeric component, a solvent for the polymeric component and a non-solvent for the polymeric component in the amount of about 70–98% by weight of the amount required to gel the polymeric composition at the temperature at which the porous substrate is treated with the solution. By the term "gel," it is meant that the polymeric component partially separates from the solvent and non-solvent of the composition. For example, if 6% by weight non-solvent will gel the polymeric composition, the non-solvent content should be from 4.2% to 5.88% by weight. Also, the non-solvent should be miscible with the solvent. By utilizing such a polymeric composition in combination with a coagulating bath temperature which is at least 10° C. below the temperature at which the substrate is treated but above the freezing temperature of the solution, coagulation is effected very rapidly—in but a fraction of the time required for prior art processes. Coagulation is followed, of course, by conventional washing and drying.

Preferably, the non-solvent for the polymeric component used in this invention is water and the polymeric component is a polyurethane polymer and preferably a blend of a polyurethane polymer and vinyl chloride polymer.

Polymers that are useful for forming the microporous sheet material of this invention have a secant tensile modulus at 5% elongation of above about 600 pounds per square inch (p.s.i.) during the entire processing cycle, i.e., from the time the polymer is coagulated into a microporous structure until it is dried. Generally, a microporous structure formed from polymers which in consolidated form have a secant tensile modulus below about 600 p s.i. collapses as the liquid is being removed or after the liquid is removed from the micropores of the structure so that a relatively impermeable product is formed. Preferably, the secant tensile modulus during the cycle is about 600–25,000 p.s.i. and more preferably, about 800–10,000 p.s.i., and still more preferably, about 800–3000 p.s.i. The secant tensile modulus is the ratio of the stress to the strain at 5% elongation of the sample determined from the tensile stress strain curve and is expressed as force per unit area, e.g., pounds per square inch. The secant tensile modulus measurement is carried out according to ASTM D–882–64–T modied as described below.

The secant tensile modulus of the polymer useful in this invention is determined by forming a 5 to 20 mil continuous void-free polymer film from the polymeric solution used in the process to form the microporus sheet material of this invention. The film is formed by casting this polymeric solution on a glass plate and the solution is then dried, e.g., at 105° C. for 90 minutes.

The stress-strain curve which is necessary to calculate the secant tensile modulus of the polymer used in the invention is preferably obtained on an Instron Tensile Tester using a ½ inch wide specimen cut from the above prepared polymeric film with about one inch between grips. The following settings are preferably used on the Instron Tester to obtain a stress-strain curve: chart speed of 10 inches per minute, cross head speed of 1 inch per minute, and a full scale load of 2 to 5 pounds.

The secant tensile modulus is obtained from the chart of the force vs. strain curve by drawing a line at 5% specimen elongation (strain) parallel to the force axis of the chart. The point at which this line intersects the force/strain curve defines the force in pounds necessary to elongate the specimen 5%. This force value is divided by the initial cross-sectional area of the specimen to give the corresponding stress value in pounds per square inch. This stress value is divided by the strain (0.05) to give the secant tensile modulus.

To initially select polymers useful in this invention, the test temperature is usually room temperature, about 23° C. At this temperature, polymers potentially useful in this invention have a secant tensile modulus at 5% elongation above about 600 p.s.i. However, as previously stated, polymers useful in this invention have a secant tensile modulus at 5% elongation of above about 600 p.s.i. during the entire process cycle; therefore, the highest temperature used during the process for forming the microporous product should be used as the test temperature, e.g., if the drying temperature is 110° C., the secant tensile modulus of a potentially useful polymer should be tested at 110° C. and at this test temperature, the secant tensile modulus at 5% elongation should be above about 600 p.s.i.

A wide spectrum of polymers that have the aforementioned secant tensile modulus can be used in this invention, for example, from mixture of vinyl addition polymers and polyurethanes to condensation polymers, such as polyamides, polyester amides and polyesters. A variety of polymers and copolymers useful in this invention are disclosed in U.S. Patent 3,100,721 to E. K. Holden which disclosure is hereby incorporated by reference. Polymers of particular usefulness in this invention are polyurethanes either alone or in a mixture with other polymers, particularly vinyl chloride polymers.

One class of polyurethanes useful in this invention are polyureas, that is, polyurethanes containing the recurring structural unit:

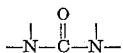

The prepolymers for the polyurethanes are prepared by mixing one or more polyalkyleneether glycols or hydroxyl-terminated polyesters with a molar excess of organic diisocyanate and heating the mixture to a temperature of about 50–100° C. to form a prepolymer having terminal-NCO groups. An alternate procedure is to react the diisocyanate with a molar excess of polyalkyleneether glycol or polyester, then cap the resulting product, that is, react it with more diisocyanate to form a prepolymer having terminal-NCO groups.

The preferred polyurethanes are the chain extended polyurea type which are formed from aliphatic polyol segments which include the polyalkyleneether glycols having $C_3$–$C_{12}$ alkylene segments and the hydroxyl-terminated polyester of $C_3$–$C_{12}$ acyclic dicarboxycyclic acid and $C_3$–$C_{12}$ alkylene glycol. Polyalkyleneether glycols are the preferred active hydrogen containing material for the prepolymer formation. The most useful polyglycols have a molecular weight of 300 to 5000, preferably 400 to 2000; some of these polyglycols are, for example, polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol, and mixtures thereof. Polyglycols containing several different radicals in the molecular chain, such as the compound $$HO(CH_2OC_2H_4O)_nH$$

wherein $n$ is an integer greater than 1 can also be used.

The preferred polyurethanes are prepared with at least a major portion of an aromatic, aliphatic or cycloaliphatic diisocyanate or mixtures thereof; for example, tolylene-2,4-diisocyanate, tolylene-2,6-diisocyanate, m-phenylene diisocyanate, biphenylene - 4,4′ - diisocyanate, methylene bis-(4-phenyl isocyanate), 4-chloro-1,3-phenylene diisocyanate, naphthalene-1,5-diisocyanate, tetramethylene-1,4-diisocyanate, hexamethylene-1,6-diisocyanate, decamethylene-1,10-diisocyanate, cyclohexylene-1,4-diisocyanate, methylene bis-(4-cyclohexyl isocyanate) and tetrahydronaphthalene diisocyanate. Arylene diisocyanates in which the isocyanate groups are attached to an aromatic ring are preferred since these isocyanates react more readily than do alkylene diisocyanates.

Polyesters can be used instead of or in conjunction with the polyalkyleneether glycols, particularly those formed by reacting acids, esters or acid halides with glycols. Suitable glycols are polyalkylene glycols, such as methylene-, ethylene-, propylene-, tetramethylene-, decamethylene glycol; substituted polyalkylene glycols, such as 2,2-dimethyl-1,3-propanediol; cyclic glycols, such as cyclohexanediol and aromatic glycols, such as xylylene glycol. Aliphatic glycols are preferred when maximum product flexibility is desired and when making microporous articles. These glycols are reacted with aliphatic, cycloaliphatic or aromatic dicarboxylic acids or lower alkyl esters or ester forming derivatives to produce relatively low molecular weight polymers, preferably having a melting point of less than about 70° C., and molecular weights like those indicated for the polyalkyleneether glycols. Acids for preparing such polyesters are succinic, adipic, suberic, sebacic, terephthalic and hexahydroterephthalic acids and the alkyl and halgen substituted derivatives of the acids.

Hydrazine is preferred as the chain extending agent for the preferred polyurethanes, although $C_1$–$C_6$ (including cycloaliphatic) diamines, such as ethylene diamine, hexamethylene diamine and dimethyl piperazine and 1,4-diamino/piperazine can also be used advantageously either alone or in a mixture with hydrazine.

A particularly preferred chain extender that provides the microporous polyurethane product with improved dyeability, superior dye retention, and improved resistance to color fading and which can be reacted with the isocyanates terminated prepolymer has the structural formula

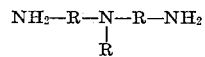

wherein R is an alkyl group containing 1–4 carbon atoms (i.e., a methyl, ethyl, propyl or butyl group). In the preferred compound, the R beneath the central N is methyl and the other two R's are propyl; thus, the preferred compound is N-methylamino-bis-propylamine.

This preferred chain extender need not consist entirely of a compound having the formula shown above. It is usually best to use a blend of a minor proportion, preferably about 5–30 mole percent, of the above preferred chain extender with a major proportion, about 95–70 mole percent, of another compound having two active hydrogen atoms bonded to amino-nitrogen atoms, preferably hydrazine. Other chain-extending compounds which can be used along with the preferred compound are mono-substituted hydrazines, dimethyl-piperazine, 4 - methyl-m-phenylene-diamine, m-phenylene-diamine, 4,4′ - diaminodiphenylmethane, 1,4-diamino-piperazine, ethylene diamine and mixtures thereof.

Polyurethane polymers made with more than about 5 mole percent of the preferred chain extender generally show the greatest improvement in dye retention and dyeability. More than about 20–30 mole percent of the preferred chain extender produces relatively little additional improvement in depth and retention of color and is usually not preferred for economic reasons. Best results are obtained with about 10–30 mole percent of the essential chain extender; a particularly preferred chain extender which gives excellent results comprises a mixture of about 80 mole percent hydrazine and 20 mole percent N-methylamino-bis-propylamine.

Mixtures of at least one vinyl polymer with a polyurethane can be used to prepare the microporous sheet material. Such mixtures, preferably containing polyvinyl chloride as the vinyl polymer, can contain from 1 to 2% of vinyl chloride polymer to about 50% thereof. Preferably such mixtures contain at least about 50% by weight of the polyurethane.

The particular solvent which is used to form a polymer solution for use in this invention depends largely upon the particular polymeric component and the non-solvents which are used. The solvent should be substantially chemically inert toward the other materials employed in the process of this invention, although the solvent can form hydrates with the non-solvent as is the case with the preferred solvent, N,N-dimethyl formamide, which forms a hydrate with water, the preferred non-solvent. Furthermore, the solvent should be miscible, preferably completely miscible, with the non-solvent and extractable from the polymer after it is coagulated. Also, the solvent should not hinder the chain extension reaction because, as in the case of polyurethanes, the prepolymer is usually chain-extended in solution before application.

Solvents which can be used in the process of this invention include amides, esters, ethers, alcohols, ketones, sulfones and phenols; a full disclosure of useful solvents appears in Holden U.S. Patent 3,100,721. N,N-dimethyl formamide and mixtures thereof are particularly preferred because they meet the above requirements with a wide variety of polymers.

To form a polymeric composition which can be readily coagulated to form a microporous structure according to this invention, a chemically inert liquid, which is a non-solvent for the polymeric component but is miscible with the solvent for the polymer is added to the polymeric solution. The criteria in selecting the non-solvent lie in the effect of the non-solvent on the secant tensile modulus at 5% elongation of the polymer, the miscibility of the non-solvent with the solvent and the inertness of the non-solvent in the entire system. Suitable inert liquids include glycol monoethyl ether, water, polyols, such as ethylene glycol, glycerol, 1,1,1-trimethylol propane and mixtures thereof. Other non-solvents include methanol, ethanol, hydrocarbons such as hexane, octane, benzene, petroleum naphtha and toluene and chlorinated hydrocarbons, such as tetrachloroethylene and chloroform. However, the preferred non-solvent is water.

The exact amount of inert non-solvent which must be added to the polymeric solution to give rapid coagulation depends on the nature of the solvent, the character of the polymeric component utilized, the concentration of the polymeric component, the non-solvent and the temperature at which it is added. For example, substantially more glycerol than water is required to give a polyurethane solution which can be used in this invention.

For rapid coagulation, about 70–98% by weigth of the amount of non-solvent which will cause polymeric composition to gel at the temperature a substrate is treated therewith is added to the ploymer solution. Preferably, the amount of non-solvent is 75–90% by weight and more preferably, the amount of non-solvent is 80–85% by weight. The amount of non-solvent which the polymer solution can contain before gellation occurs depends on the temperature of the solution, i.e., the higher the solution temperature the more non-solvent the polymeric solution can contain. For example, a polyurethane polymer solution at 40° C. can contain up to 4.75% by weight water which is a non-solvent, while at 50° C., it can contain up to 5.4% by weight water before the polymeric composition will gel. The percent non-solvent is determined by dividing the weight of the non-solvent by the weight of the polymer solution plus the weight of the non-solvent.

Also, the higher the non-solvent concentration in the polymeric solution, the more rapidly the polymeric component will coagulate when the temperature of the treated substrate is reduced. To obtain very rapid coagulation, it is desirable to use a high concentration of non-solvent in the polymeric solution, i.e., about 98% by weight as defined above and reduce the temperature of the treated substrate 15 to 30° C. or more below the treating temperature. In general, if the non-solvent concentration exceeds 98% by weight, gellation of the polymer solution often readily occurs with only a slight temperature change in the solution. A gelled polymeric solution or suspension is often difficult to use in coating or impregnating equipment because of its high viscosity.

It is preferred to add the non-solvent to the polymeric solution at the temperature at which the solution is to be used to treat the substrate and maintain the solution at this temperature to prevent gellation. The practical upper temperature of the polymeric solution is the temperature at which the substrate which is being treated begins to deform or the temperature at which the polymeric component begins to degrade. In general, it is not desirable to use polymer solution temperatures over 60° C. for the preferred substrate of polyethylene terephthalate fibers.

About 70% by weight of the amount of non-solvent which will cause the polymeric solution to gel can be used to obtain rapid coagulation but generally coagulation temperatures of 0° C. and below are often necessary at this non-solvent concentration, however, the coagulation temperature should not be below the freezing point of the polymeric solution. Obviously, very low coagulation temperatures do not allow the use of preferred non-solvent, water, in the above amount making it necessary to use some other non-solvent, such as ethylene glycol, glycerol and the like.

To obtain the advantage of this invention, i.e., rapid polymer coagulation, a coagulation temperature which is at least 10° C. below the treating temperature must be used along with a polymeric solution containing 70–98% of the amount of non-solvent which will gel the polymeric solution at the temperature at which a substrate is treated therewith. A practical range of the non-solvent concentration in the ploymeric solution which is particularly useful for rapid coagulation of the polymeric component can be determined for any non-solvent by formulating a series of polymeric solutions at the temperature at which they are to be used to treat the substrate, and having a range of non-solvent concentrations within the 70–98% limits.

The polymeric solutions having various non-solvent concentrations are each used to treat an equal number of substrates and then the polymeric components in the treated substrates are coagulated at various temperatures from 10° C. below the treating temperature to the freezing temperature of the polymeric solution and the time required to coagulate the polymeric component is recorded. For instance, when using water, the preferred non-solvent, the polymeric component is coagulated at 10, 20, 30 and 45° C. below the treating temperature. By plotting a graph of coagulation time versus non-solvent concentration of the polymeric solution, the most economical conditions for rapid polymer coagulation are readily determined.

By using the aforementioned procedure for the preferred polymeric composition containing a polyurethane polymer, water as the non-solvent and a solvent for the polymer, one preferred set of economical operating conditions which give rapid polymer coagulation are to treat the porous substrate at about 40–60° C. using a non-solvent content of about 3.8–6.5% by weight water and a coagulating temperature 15–25° C. below the treating temperature. Another preferred process comprises impregnating a porous non-woven substrate at 45° C. with a polyurethane solution containing about 4.5–5% by weight water as the non-solvent and reducing the temperature of the substrate to about 20–25° C.

For the coagulation medium, it is preferable to use the same non-solvent which is used in the aforementioned polymeric solution. Water is preferably used to coagulate the polymeric component; however, ethylene glycol, glycerol, or any of the other aforementioned non-solvents can be used in place of water in either step.

In prior art procedures for preparing microporous materials, the polymeric compounds are coagulated by diffusion of the non-solvent into the polymeric layer in which the non-solvent is about the temperature of the polymeric component which results in a relatively slow polymer coagulation rate. By using the process of this invention, polymer coagulation rates can be increased by 8 times or more in comparison to the prior art as illustrated hereinafter by Example 1. In accordance with the present invention by maintaining the necessary non-solvent concentration of the polymeric solutions within the aforementioned limits, the solvent content in the coagulation medium has very little effect on the polymer coagulation rate. For instance, from 0–30%, N,N-dimethyl formamide or other solvents may be present in the preferred coagulation medium, water, without significant loss in coagulation rate.

After the polymeric component is coagulated, the treated substrate can be immersed in a non-solvent, which is at about the coagulation temperature, to remove all of the solvent; however, it can also be sprayed with a non-solvent that is at about the coagulation temperature to remove the solvent. Again, the non-solvent used in the bathing step of this process preferably is water, particularly to remove the preferred solvent N,N-dimethyl formamide. The time of the bath treatment is not critical provided that the coagulated polymer is left in contact with the liquid for sufficient time to completely remove all solvent.

Preferably, the removal of residual solvent is accomplished by immersing the treated substrate in a non-solvent, preferably water, and immediately passing the substrate over a vacuum source which forces liquid through the sheet and removes the residual solvent. This is easily accomplished by methods well known in the art. For instance, the treated substrate is passed around a vacuum-filter drum which is immersed in a water bath, and a vacuum is applied to the drum which forces water through the treated substrate thereby removing the residual solvent.

Next, the polymeric component is dried, either at room temperature or at elevated temperature, for example, at about 50–100° C. However, the secant tensile modulus of a polymer decreases as temperature increases; therefore, with polymers having a secant tensile modulus approaching 600 pounds per square inch, it is desirable to lower the temperatures of drying to room temperatures or to use a vacuum drying technique.

The process of this invention is particularly useful for rapidly impregnating porous substrates which are used in the manufacture of leather replacement materials; for example, woven twills, drills and ducks; jersey, tricot and knitted materials; felts and needle punched porous batts. The choice of the particular fibers from which the substrate is made is not critical; they include those made from polyamides, polyesters, polyesteramides, acrylic polymers, viscous rayon, wool, cotton, glass and mixtures thereof. The preferred substrate used in the manufacture of microporous sheet materials which are used as a leather replacement is a porous non-woven needle punched web of polyethylene terephthalate fibers. These substrates are impregnated by immersion or by otherwise applying the polymeric solution to the substrate; the polymeric solution penetrates the substrate and the polymeric component is then rapidly coagulated by the process of this invention.

Extender pigments, such as finely divided silica, carbon black, calcium carbonate and the like are often added to the polymeric solution used for impregnating the porous substrates to reinforce the coagulated polymer. The preferred extender is silica which is added preferably in amounts of 1 to 12% by weight of the polymeric component.

The process of this invention is also useful in applying microporous polymeric coatings on porous substrates, particularly porous synthetic organic polymer impregnated substrates. The coatings are applied by conventional coating techniques, such as knife, roller or reverse roller coating and are rapidly coagulated by the process of this invention. One particularly useful and preferred microporous material formed by the process of this invention is a porous non-woven, preferably heat shrunk, batt of polyethylene terephthalate fibers impregnated with a polyurethane polymer which is coagulated, washed and dried and coated with a polyurethane polymer which is coagulated, washed and dried. Also, unsupported microporous films can be prepared by coating one of the aforementioned polymeric solutions onto a substrate, such as glass or stainless steel, followed by stripping the resulting microporous coating from the substrate.

Microporous materials, particularly those prepared from polyurethane polymer blends by the process of this invention make excellent replacements for natural leather and upholstery, luggage, handbags, gloves, boots, shoe uppers and clothing. These products have wearing comfort, durability and tactile properties at least as good as those of natural leather.

The following examples illustrate the invention. Parts and percentages are by weight unless otherwise indicated.

EXAMPLE 1

Preparation of the polyurethane solution

A 20% solution of polyurethane elastomer is prepared by first mixing 3343 parts of polytetramethyleneether glycol of about 1000 molecular weight with 291 parts of tolylene-2,4-diisocyanate and heating the mixture for 3 hours at 90° C. Then 2485 parts of the resulting hydroxyl-end-group-containing dimer are mixed with 570 parts of methylene-bis-(4-phenyl-isocyanate). This mixture is heated for one hour at 80° C., yielding a prepolymer with isocyanate end groups. The prepolymer is dissolved in 10,000 parts of N,N-dimethyl formamide (sometimes referred to simply as dimethyl-formamide), and the resulting solution is added slowly with continued mixing to a solution consisting of 50 parts of chain-extender dissolved in 1,710 parts of dimethyl formamide. The chain-extender consists of N-methylamino-bis-propylamine and hydrazine hydrate in a molar ratio of 40:60. The resulting reaction mixture is stirred at 40° C. for 30 minutes to form a polyurethane solution having a viscosity of about 115 poises and a polymer content of about 20%.

Preparation of the impregnating solution

*Solution A.*—The above polyurethane solution is mixed with a 12% solids solution of a copolymer of 85% vinyl chloride, 12% vinyl acetate and 3% vinyl alcohol dissolved in N,N-dimethyl formamide to form a 17% solids solution in which the weight ratio of polyurethane to vinyl copolymer is 94.4/5.6.

*Solution B.*—About 1912 parts of the above Solution A are mixed with 300.8 parts of a 27% solids solution of a copolymer of 85% vinyl chloride and 15% vinyl acetate dissolved in N,N-dimethyl formamide and having dispersed therein finely divided silica particles and wherein the weight ratio of copolymer to silica is 60/40.

The secant tensile modulus at 5% elongation is determined on the above prepared polymer by coating about a 20 mil thick film of Solution B on a glass plate and drying this film at about 45° C. for about 15 minutes. A ½ inch wide sample is cut from the dried film and placed in an Instron Tensile Tester: chart speed of 10 inches per minute; cross head speed of 1 inch per minute; full scale load of 2 pounds and test sample length of 1 inch between bench marks. The test temperature is 145° C. since this is the highest temperature used in the process.

The secant tensile modulus at 5% elongation is determined from the stress-strain curve by measuring the force in pounds at 5% sample elongation and dividing this value by the strain and cross-sectional area of the test sample. The secant modulus value calculated for the polymer is about 1050 p.s.i.

Five of the above "B" Solutions are formulated and each is adjusted to a predetermined water content by the addition of a 70/30 N,N-dimethyl formamide/water solution and undiluted N,N-dimethyl formamide. The final solutions each have a 14.5% solids content and contain 3%, 4%, 4.5%, 5% and 5.25% water respectively. Each of the above solutions is used to impregnate a porous non-woven mat about 250 mils thick of heat shrunk polyethylene terephthalate fibers about 1½ inches in length and 1.25 denier. In each instance, four non-woven mats are impregnated by each of the solutions by immersion in the polymer solution which is maintained at 45° C. for a few minutes, followed by removal from the solution and squeezing excess impregnant from the mat.

In each case, the polymeric component in the four impregnated mats is then coagulated at four different temperatures respectively by immersing each mat in a water bath to coagulate the polymer. The following temperatures are used to coagulate the polymer: 0–1° C., 15° C., 25° C. and 35° C. The time necessary to coagulate the polymer is noted in each instance and the results are recorded in Table I.

Polymer coagulation is determined by periodically cutting off a small portion of the impregnated mat being coagulated in the bath, and squeezing this cut portion of the mat which causes any uncoagulated polymer to exude from the mat. The time when no polymer exudes from the mat is noted and recorded as the coagulation time.

The mat containing the coagulated polymer sheet material is passed into a water bath and over a vacuum filter drum positioned in the water bath. A vacuum of about 5 inches Hg is applied to the drum which forces water through the mat thereby removing all residual solvent and the sheet is air dried at about 100° C. The coagulation times in the four different baths for each of the above dispersions are in Table I. The resulting polymer impregnated substrate is useful as a substrate in the manufacture of microporous materials because of its uniform porosity, flexibility and flex resistance.

TABLE I

| Percent Water In Polymeric Solution | Coagulation Temperature, ° C. | | | |
| --- | --- | --- | --- | --- |
|  | 0–1 | 15 | 25 | 35 |
|  | Coagulation Time (minutes) | | | |
| 3 | 27 | 24 | 22 | 21 |
| 4 | 4 | 18 | 19 | 17.5 |
| 4.5 | 1.6 | 4.0 | 13.0 | 14.5 |
| 5 | 0.75 | 1.5 | 4.0 | 10 |
| 5.25 | 0.5 | 0.75 | 1.5 | 5 |

EXAMPLE 2

The polyurethane solution of Example 1 is mixed with a 12% solids solution in N,N-dimethyl formamide of "Vinylite VYHH" which is a copolymer of 85% vinyl chloride and 15% vinyl acetate to form a 17% solids solution in which the weight ratio of polyurethane to vinyl copolymer is 4/1. This solution is adjusted to a 4% water content by the addition of 70/30 N,N-dimethyl formamide/water solution and undiluted N,N-dimethyl formamide, the resulting solution has a 14.5% solids content.

The secant tensile modulus at 5% elongation of this polymer is determined as in Example 1, except a test temperature of about 23° C. is used. The secant tensile modulus for this polymer is about 1800 p.s.i.

A porous non-woven mat about 200 mils thick of heat shrunk polyethylene terephthalate fibers about 1½ inches in length and 1.25 denier is impregnated with the above solution at 45° C. according to the procedure of Example 1. After the web is impregnated, it is immersed in a water bath at about 0° C. to coagulate the polymer. The polymer is coagulated in about 4 minutes compared to about 18 minutes required for coagulation at about 20° C. The polymeric sheet material is removed from the cold temperature coagulation bath and then treated with a water bath containing vacuum filter drum according to Example 1 to remove all residual N,N-dimethyl formamide then the mat is air dried at room temperature.

The product of this example is also found useful as a substrate in the manufacture of a microporous material for use in clothing, shoes, boots and the like.

EXAMPLE 3

A polymeric solution is prepared by using the components and the procedure of Example 1 of Holden U.S. Patent 3,100,721. The polymeric solution is adjusted to a 4.25% water content and a 14.5% solids content by adding a 70/30 N,N-dimethyl formamide/water solution and undiluted N,N-dimethyl formamide.

The secant tensile modulus at 5% elongation is determined for the above polymer according to the procedure of Example 1 and using a test temperautre of 100° C. is calculated and is substantially above 600 p.s.i.

A 100 mil wet film of this dispersion is coated at about 25° C. onto a microporous, impregnated non-woven mat of heat shrunk polyethylene terephthalate fibers about 1½ inches in length and 1.25 denier. The non-woven substrate has previously been impregnated with the polymer solution in Example 1.

The coated substrate is immersed in water at about 0° C. and the coating is coagulated in about ½ minute compared to about 7½ minutes required to coagulate a similar coating at about 25° C. The resulting product is removed from the coagulation bath and then treated with a water bath containing a vacuum filter drum according to Example 1 to remove all residual N,N-dimethyl formamide from the coating.

The coated substrate is subjected to steam at 100° C. for about 15 minutes and dried at about the same temperature. The resulting product is a microporous fibrous substrate that has an adhering uniformly mocroporous coating and has a water vapor permeability value of about 10,000 grams of water per 100 square meters per hour as determined by the test described by Kanagy and Vickers in the Journal of Leather Chemists Association, 45, 211–242 (April 1950).

The product of this example is useful as a mocroporous sheet material for clothing, shoes, boots and the like, and is particularly useful for shoe uppers because of its porosity, flex resistance and high abrasion resistance.

I claim:

1. In the process for preparing a microporous sheet material by impregnating a porous substrate with a polymeric composition followed by coagulation of the polymeric component and washing and drying the substrate, wherein the polymeric component has a secant tensile modulus at 5% elongation of about 600 pounds per square inch under the conditions of washing and drying, the improvement, in combination therewith, comprising (a) utilizing as said polymeric composition for impregnating a porous substrate a polymer solution containing the polymeric component, a solvent for the polymeric component and a non-solvent for the polymeric component which is miscible with the solvent in an amount of about 70–98% by weight of the amount of non-solvent for the polymeric component which will gel said polymeric composition at the temperature at which said porous substrate is impregnated; (b) coagulating the polymeric component of the impregnated porous substrate from said solution by reducing the temperature of said substrate to a temperature at least 10° C. below the temperature at which the substrate is impregnated but above the freezing temperature of the solution by treating the substrate with a non-solvent for the polymeric component.

2. The process of claim 1 in which the non-solvent is water and the polymeric component comprises a polyurethane polymer.

3. The process of claim 1 in which the polymeric composition comprises a polymeric component consisting essentially of at least 50% by weight units of a polyurethane polymer and up to 50% by weight units of a vinyl chloride polymer, 3.8 to 6.5% by weight of water as the non-solvent, based on the weight of the polymeric composition, and N,N-dimethyl formamide as the solvent for said polymeric component.

4. In the process for preparing a microporous sheet material by impregnating a porous substrate with a polymeric composition followed by coagulation of the polymeric component and washing and drying the substrate wherein the polymeric component has a secant tensile modulus at 5% elongation of about 800–3000 pounds per square inch under the conditions of washing and drying, the improvement, in combination therewith, comprising (a) utilizing as said polymeric composition for impregnating the porous substrate at about 40 to 60° C. a polymer solution containing a polymeric component consisting essentially of at least 50% by weight units of a linear polyurethane polymer and up to 50% by weight units of a vinyl chloride polymer; a solvent for the polymeric component, and about 4–6% by weight, based on the weight of the polymeric composition, of water as the non-solvent for the polymeric component, (b) coagulating the polymeric component of the impregnated substrate by treating the substrate in a water bath which is at a temperature at least 15° C. below the temperature at which the substrate is impregnated but above the temperature of 0° C.

5. The process of claim 4 in which the porous substrate is a non-woven web of polyethylene terephthalate fibers.

6. The process of claim 4 in which the linear polyurethane polymer has a molecular weight of about 5000–300,000, and is formed by reacting an organic diisocyanate with the active hydrogen containing polymeric material selected from the group consisting of polyalkyleneether glycols and hydroxyl terminated polyesters to produce an isocyanate terminated polyurethane prepolymer which is chain-extended with a compound having at least two amino nitrogen atoms, each having at least one reactive hydrogen attached thereto.

7. The process of claim 4 in which the polymeric component contains about 1–12% by weight colloidal silica extender pigment and in which solvent for the polymer is N,N-dimethyl formamide.

8. The process of claim 7 in which the polymeric component is coagulated by reducing the temperature of the impregnated substrate to a temperature at least 20° C. below the temperature of impregnation but above the temperature of 0° C.

References Cited

UNITED STATES PATENTS

| 2,649,388 | 8/1953 | Wills et al. | 117—119.2 |
| 3,100,721 | 8/1963 | Holden. | |
| 3,208,875 | 9/1965 | Holden. | |

ALFRED L. LEAVITT, Primary Examiner

J. A. BELL, Assistant Examiner

U.S. Cl. X.R.

117—63, 119.2, 135.5